(12) United States Patent
Alizadeh-Shabdiz et al.

(10) Patent No.: US 11,553,449 B1
(45) Date of Patent: Jan. 10, 2023

(54) POSITIONING SYSTEM WITH MULTI-LOCATION BEACONS

(71) Applicant: Skyhook Wireless, Inc., Boston, MA (US)

(72) Inventors: Farshid Alizadeh-Shabdiz, Wayland, MA (US); Russel K. Jones, Roswell, GA (US); Joel Morrin, North Reading, MA (US)

(73) Assignee: Skyhook Wireless, Inc., San Diego, CA (US)

( * ) Notice: Subject to any disclaimer, the term of this patent is extended or adjusted under 35 U.S.C. 154(b) by 168 days.

(21) Appl. No.: 17/162,407

(22) Filed: Jan. 29, 2021

Related U.S. Application Data

(60) Provisional application No. 62/967,400, filed on Jan. 29, 2020.

(51) Int. Cl.
*H04W 24/00* (2009.01)
*H04W 64/00* (2009.01)

(52) U.S. Cl.
CPC ................................. *H04W 64/003* (2013.01)

(58) Field of Classification Search
CPC .................................................. H04W 64/003
See application file for complete search history.

(56) References Cited

U.S. PATENT DOCUMENTS

| | | | |
|---|---|---|---|
| 8,542,637 B2 | 9/2013 | Bandhakavi et al. |
| 8,577,389 B2 | 11/2013 | Lin et al. |
| 8,700,053 B2 | 4/2014 | Alizadeh-Shabdiz et al. |
| 8,837,363 B2 | 9/2014 | Jones et al. |
| 8,971,915 B2 | 3/2015 | Alizadeh-Shabdiz et al. |
| 8,971,923 B2 | 3/2015 | Alizadeh-Shabdiz et al. |
| 9,014,715 B2 | 4/2015 | Alizadeh-Shabdiz et al. |
| 9,521,512 B2 | 12/2016 | Alizadeh-Shabdiz et al. |
| 9,955,303 B2 | 4/2018 | Baker |
| 10,034,265 B2 | 7/2018 | Alizadeh-Shabdiz et al. |

*Primary Examiner* — Justin Y Lee

(74) *Attorney, Agent, or Firm* — Skyhook Wireless, Inc.

(57) ABSTRACT

In various embodiments, techniques are provided for determining and associating multiple locations with beacons, and estimating a location of an electronic device based on beacons having multiple associated locations. To determine multiple locations of a beacon, observations are grouped into observation clusters, a probability is calculated that each observation cluster accurately describes the beacon, multiple observation clusters are selected as representative of the beacon based on the calculated probabilities, characteristics are derived for the beacon (including multiple locations) based on the selected multiple observation clusters, and at least the multiple locations for the beacon are stored in a reference database. To estimate a location of an electronic device, a list of detected beacons is created, one or more locations are accessed from a reference database for each of the beacons on the list of detected beacons with at least one of the beacons having multiple locations, the locations are grouped into location clusters, a probability each location cluster represents a location of the electronic device is calculated, an location cluster is selected to represent the location of the beacon based on the calculated probabilities, and a location of the electronic device is estimated based on the selected location cluster.

20 Claims, 6 Drawing Sheets

POSITIONING SYSTEM WITH MULTI-LOCATION BEACONS

RELATED APPLICATION

The present application claims the benefit of U.S. Provisional Patent Application No. 62/967,400 filed on Jan. 29, 2020 by Farshid Alizadeh-Shabdiz et al., titled "Positioning System with Multi-Location Beacons", the contents of which are incorporated by reference herein in their entirety.

BACKGROUND

Technical Field

The present disclosure relates generally to electronic device positioning, and more specifically to techniques for determining and associating multiple locations with beacons, and estimating a location of an electronic device based on beacons having multiple associated locations.

Background Information

Location-based services are becoming increasingly important to businesses and consumers. Often, to provide location-based services, a positioning system is called upon to determine a geographic location of an electronic device based on received wireless signals from beacons. Information is extracted from the wireless signals and used to look up a location of each of the beacons in a database. Typically, a single "best" location is maintained in the database for each beacon, which represents the most likely location of the beacon, as determined by the positioning system. The location of the electronic device is estimated from the single "best" location of the beacons whose wireless signals are received.

While such a technique is operable, it suffers from some shortcomings. For example, it is reliant upon the single "best" location of beacons being accurate. This may be problematic in a variety of circumstances, for example, in the case of beacons that are moved on a regular basis as part of its intended operation. Such movement may be the result of physical relocation of electronic devices, reassignment of an identifying number or alphanumeric tag among electronic devices, or other factors. For a mobile beacon, a single location may not accurately characterize the beacon, and may hinder rather than assist a positioning algorithm when used to determine the location of an electronic device.

Accordingly, there is a need for improved techniques that can address these and/or other shortcomings.

SUMMARY

In various embodiments, techniques are provided for determining and associating multiple locations with beacons, and estimating a location of an electronic device based on beacons having multiple associated locations. Rather than select a single "best" location for a beacon, and discard all other locations, a positioning system may maintain multiple locations in a reference database, each stored in association with a respective probability the beacon is actually located at that location. The multiple locations, together with the probabilities, may then be used to estimate the location of electronic devices. Such techniques may be applicable to physical beacons (i.e. uniquely identifiable electronic devices that emit wireless signals and that have least one geographic location) and virtual beacons (i.e. numbers or alphanumeric tags that are assigned to electronic devices to uniquely identify them within a domain and that have at least one geographic location.)

In one specific embodiment, to determine multiple locations of a beacon, observations are grouped into observation clusters, a probability is calculated that each observation cluster accurately describes the beacon, multiple observation clusters are selected as representative of the beacon based on the calculated probabilities, characteristics are derived for the beacon (including multiple locations) based on the selected multiple observation clusters, and at least the multiple locations for the beacon are stored in a reference database.

In another specific embodiment, to estimate a location of an electronic device, a list of detected beacons is created, one or more locations are accessed from a reference database for each of the beacons on the list (with at least one of the beacons having multiple locations), the locations are grouped into location clusters, a probability that each location cluster represents a location of the electronic device is calculated, an location cluster is selected to represent the location of the beacon based on the calculated probabilities, and a location of the electronic device is estimated based on the selected location cluster.

It should be understood that the embodiments discussed in this Summary may include a variety of other features, including other features discussed below, and variations thereof. Further, a variety of other embodiments may be utilized involving various combinations of the features discussed below and variations thereof. This Summary is intended simply as a brief introduction to the reader, and does not imply that the specific features mentioned herein are all the features of the invention, or are essential features of the invention.

BRIEF DESCRIPTION OF THE DRAWINGS

The description below refers to the accompanying drawings of example embodiments, of which.

DETAILED DESCRIPTION

Definitions

Figure 1:
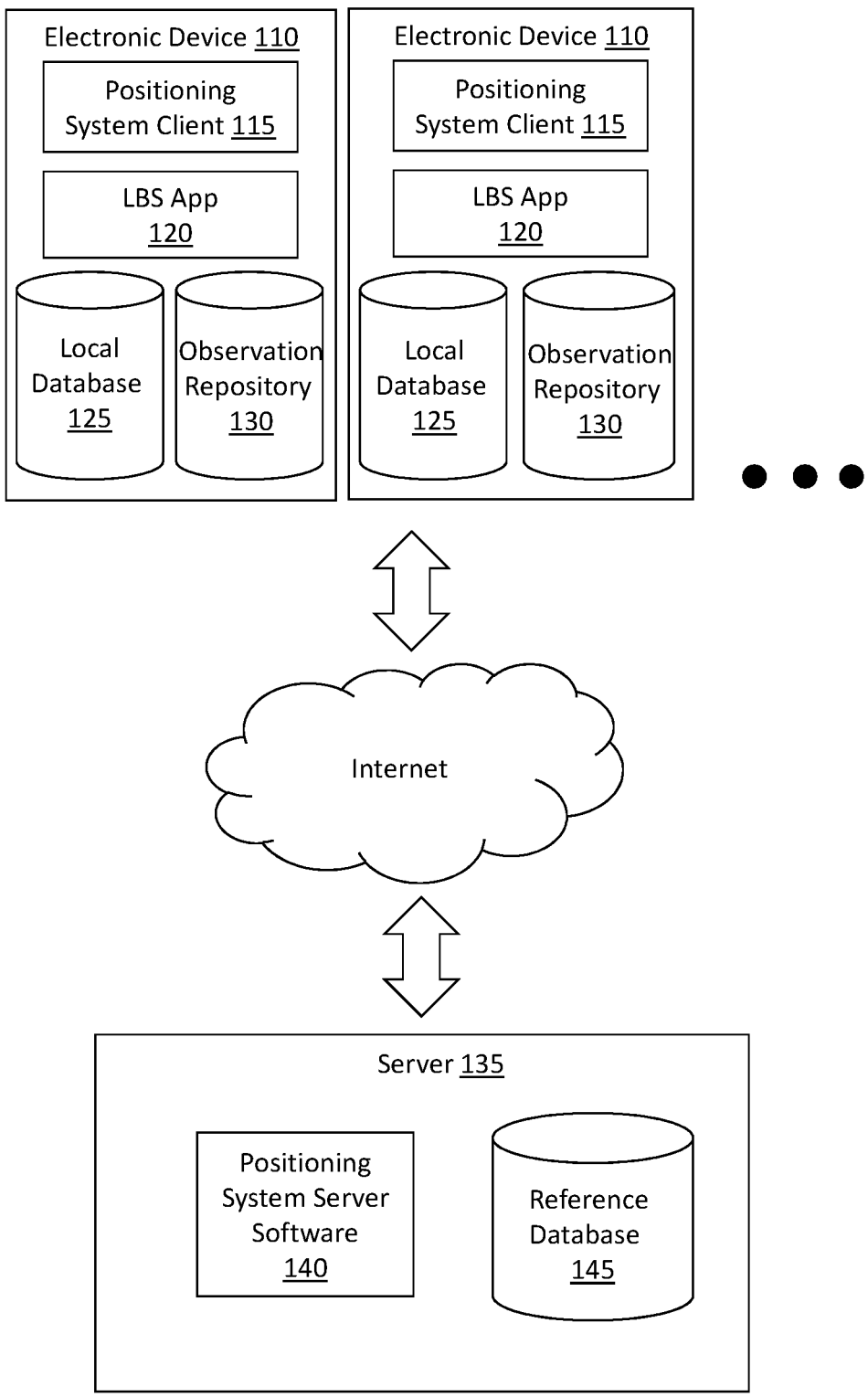
FIG. 1 is a block diagram of an example positioning system.

As used herein, the term "electronic device" refers to a hardware device with electronic components. An electronic device may be a "mobile device", a "substantially static device", or another type of device.

As used herein, the term "mobile device" refers to an electronic device adapted to be frequently transported. Examples of mobile devices include smartphones, tablet computers, and smartwatches, among other readily transportable electronic devices.

As used herein, the term "substantially static device" refers to an electronic device adapted to be maintained at a fixed location for at least a majority of the time. Examples of substantially static devices include desktop computers, network appliances and network infrastructure. While substantially static devices may be relocated on occasion, they are not adapted to be regularly transported.

As used herein the term "location" refers to a point or region of signal propagation. A location may be thought of as set of one or more time-space diverse points.

As user herein the term "beacon" refers to an entity that can be uniquely identified that has a geographic location. A beacon may be a "physical beacon", a "virtual beacon" or another type of beacon.

As used herein, the term "physical beacon" refers to a uniquely identifiable electronic device that emits wireless signals (e.g., radio waves) and has at least one geographic location. Beacon information can be derived from the wireless signals emitted by a physical beacon. Examples of physical beacons include Wi-Fi access point (APs), Bluetooth or Bluetooth Low Energy (BLE) devices (Android® beacons, iBeacon® beacons, etc.), cellular base stations, and the like.

As used herein, the term "virtual beacon" refers to a number or alphanumeric tag that is assigned to an electronic device to uniquely identify it within a domain, which has at least one geographic location. The domain may be based on political boundaries (e.g., a city, a country, the entire world etc.), network boundaries (a local area network (LAN), a part of the Internet, the entire Internet), virtual boundaries (e.g., a part of a virtual world, an entire virtual world, etc.), or other type of boundaries. Examples of virtual beacons include media access control (MAC) addresses, cell base station unique identifiers (IDs), and Internet Protocol (IP) address, service set identifiers (SSIDs), and the like.

As used herein, the term "beacon information" refers to information describing properties or qualities of a beacon. Examples of beacon information include assigned identifiers of beacons (MAC addresses, cell base station unique IDs, IP addresses, SSIDs, etc.) and received signal strengths (RSSIs) of various wireless signals (e.g., Wi-Fi, BLE, cellular, etc.).

As used herein, the term "observation" refers to a set of beacon information associated with a location. The location may be determined in any of a variety of manners. For example, a satellite positioning system (e.g., GPS) may estimate the location based on satellite ephemeris data, a beacon-based positioning system may estimate the location based on beacon locations, a hybrid positioning system may estimate the location based on a combination of satellite, beacon and or other types of data, a user interface may request the location from a human user, software may determine the location from a street address available to the software, etc.

As used herein, the term "coarse location error" refers to a measure of significant deviations in an estimated location of an electronic device from the actual location of the electronic device (e.g., the estimated location is in Chicago and not in Boston). In some embodiments, coarse location error is considered mathematically as a measure of error on the order of the distances between clusters created by a clustering algorithm used in determining locations of beacons.

As used herein, the term "fine location error" refers to a measure of imprecision in an estimated location of an electronic device that is within the general vicinity of the actual location of the electronic device (e.g., the estimated location is 20 feet to the left of the actual location). In some embodiments, fine location error is considered mathematically as a measure of error on the order of cluster size of clusters created by a clustering algorithm used in determining locations of beacons.

As used herein, the term "tile" refers to a geographically-bounded set of information. A tile may include positions and characteristics of beacons within the geographical bounds.

Example Embodiments

1. General Overview of an Example Positioning System

FIG. 1 is a block diagram of an example positioning system 100. The example positioning system includes a number of electronic devices 110 (e.g., mobile devices such as smartphones, tablet computers, etc., and substantially static devices such as desktop computers, network appliances, etc.) that each have at least a processor, a memory storing software and data, and a wireless interface (e.g., a Wi-Fi interface, BLE interface, cellular interface, etc.).

The software stored in the memory may include an operating system (not shown), a positioning system client 115, and one or more location-based service (LBS) applications (apps) 120. The positioning system client 115 may be configured to utilize the wireless interface to capture beacon information for beacons proximate to the mobile device (e.g., within signal reception range of the mobile device). The beacon information may be used by the positioning system client 115 to estimate a location of the electronic device 110 and to produce observations that include the beacon information and the location of the observation (i.e. the location of the electronic device which observed the beacon). The one or more LBS apps 120 may request and consume location of the electronic device 110 to provide location-based services to a user of the electronic device 100. The data stored in the memory may include a local copy of at least a portion of a reference database as 125 as an observation repository 130. The local copy of the reference database 125 may store downloaded beacon information used by the positioning system client 115 to determine the location of the electronic device 110 (e.g., selected "tiles" that represent sets of information for a geographically bounded areas proximate the electronic device 110). The observation repository 130 may store observations of beacons produced by the positioning system client 115 that are awaiting upload or other use.

The electronic devices 110 communicate over the Internet 130 with one or more servers 135 that each at least has a processor and a memory storing software and data. The software may include positioning system server software 140 that receives and processes observations from the positioning system clients 115, aggregating them to determine characteristics of beacons, including locations, probabilities and other characteristics. The positioning system server software 140 provides the characteristics of beacons (e.g., location, probability, etc.) to the positioning system clients 115 to update their local copy of the reference database 130, among other functions. The data stored in the memory may include a reference database 145 that serves as a central repository for beacon information, associating beacon identifiers (IDs) with characteristics (e.g., location, probability, etc.) determined by aggregating observations of the beacons. As explained in more detail below, at least some beacons may be associated with multiple locations, each with a respective probability.

In typical operation, the positioning system client 115 on a given electronic device 110 uses the wireless interface of the electronic device to capture beacon information for nearby beacons (e.g., beacons within signal reception range) based on detection of their wireless signals and produces observations that store the beacon information in association with a location of the electronic device. The observations may be temporarily stored in the observation repository 130. Periodically, the positioning system client 115 uploads the observations (or a selected subset or summary thereof) to the positioning system server software 140. The positioning system server software 140 processes the observations from the given electronic device 110 by filtering the observations and grouping the observations together with observations from other electronic devices 110 into clusters using one or more clustering algorithms. The clustering algorithms may utilize spatial criteria, temporal criteria, spatio-temporal criteria, or other criteria to form clusters. The positioning system server software 140 calculates a probability each cluster accurately describes the beacon, and clusters having a probability that meets a predetermined threshold are selected and retained. Clusters having a probability below the predetermined threshold may be discarded. Characteristics are derived from the selected clusters, including at least a location for the cluster. The characteristics of a cluster serve as beacon characteristics for the beacon associated with the cluster (e.g., the cluster's location serves as the beacon's location). While some beacons may be associated with a single cluster, at least some beacons are associated with multiple clusters, that each may have different characteristics, including a different location. As a result, beacons are associated with multiple location (e.g., with different probabilities of association). Such multiple locations and probabilities are retained and stored together with other characteristics of the beacons in the reference database 145.

The local copy of the reference database 125 on the given electronic device 110 is updated from time-to-time to include new locations, probabilities and other characteristics of beacons (e.g., by downloading "tiles" from the reference database 145 for areas proximate the given electronic device 110). To determine the location of the given electronic device 110, the positioning system client 115 uses the wireless interface of the electronic device to detect beacon information for nearby beacons (e.g., beacons within signal reception range). The positioning system client 115 filters the detected beacons and remaining detected beacons are looked up in the local copy of the reference database, to determine their locations and probabilities. The detected beacon locations and probabilities are provided to a positioning algorithm to determine one or more potential locations at which the given electronic device 110 may be located. To accomplish this, the positioning algorithm may use clustering. For example, the locations may be grouped into clusters and a probability calculated that each cluster represents a location of the electronic device. A cluster with a highest probability is selected and the positioning algorithm calculates an estimated location of the given electronic device 110 from the selected cluster. The estimated location may be provided by the positioning system client 115 to an LBS app 120 operating on the given electronic device, for use in offering location-based services to a user. The estimated location may also be used in new observations being produced by the given electronic device 110 that are eventually aggregated to improve the reference database 154, creating a closed feedback loop.

It should be understood that many variations and additions may be made to the example positioning system 100 discussed in this general overview. In particular, it should be understood that operations may be performed by different software executing on different devices, such that at least some operations described as being performed by the positioning system client 115 may be instead performed by the positioning system server software 140, and vice versa. To that end, the positioning system client 115 and/or positioning system server software 140 may be sometimes referred to below simply as the "positioning system", to emphasize the possibility of either client-side or sever-side operation.

2. Physical Beacons and Virtual Beacons

Beacons utilized in the example positioning system 100 may be classified as physical beacons or virtual beacons. A physical beacon (e.g., a Wi-Fi AP, BLE device, cellular base station, etc.) is a uniquely identifiable electronic device that emits wireless signals (e.g., radio waves) and that has at least one geographic location. Physical beacons may be mobile or substantially static. In the case of a physical beacon being mobile, the physical beacon may be moved on a regular basis as part of its intended operation. An example of a mobile physical beacon is a Wi-Fi AP installed on a train or bus. Such a Wi-Fi AP is intended to travel with the bus or train and move across a wide area during a typical day's operation. Conversely, in the case of a physical beacon being substantially static, the device may be intended to stay in a stationary location for long periods of time. An example of a substantially static physical beacon may be a Wi-Fi AP installed in a user's home. Such Wi-Fi AP is intended to stay in the same location for months, or even years. However, it should be remembered that such a beacon is not always stationary, and given enough time may move. For example, a user may sell their home, disconnected the Wi-Fi AP, transport it to their new home, and then reconnect the Wi-Fi AP in this new location.

A virtual beacon (e.g., MAC address, cell base station unique ID, IP address, SSID etc.) is a number or alphanumeric tag that is assigned to an electronic device to uniquely identify it within a domain, which has at least one geographic location. Virtual beacons may have a one-to-one, one-to-many, many-to-many, or many-to-one relationship with physical beacons. For example, a cell base station unique ID may be assigned to one physical cell base station in a one-to-one relationship, an SSID may be assigned to multiple physical Wi-Fi APs in a one-to-many relationship, multiple MAC addresses may be assigned to the same Wi-Fi AP in an enterprise Wi-Fi network in a many-to-one relationship, etc.

Further, these relationships may be persistent or transient. For example, a cell base station ID may be persistently assigned to a cell base station for the life of the cell base station (or until a rare system reconfiguration), or a MAC address may be persistently assigned to a Wi-Fi AP or BLE device for the life of the AP or device. Conversely, an IP address may be transiently assigned (e.g., via Dynamic Host Configuration Protocol (DHCP)) to any of a number of different Wi-Fi APs.

As a result of the relationships between physical beacons and virtual beacons, virtual beacons can be mobile or substantially static. A virtual beacon may be mobile because it is persistently assigned to one or more mobile physical beacons (the mobility resulting from movement of the physical device(s)). Alternatively, a virtual beacon may be mobile as a result of it being transiently assigned to multiple substantially static physical beacons (the mobility resulting from the changing assignment among device(s)).

For the class of virtual beacons that have a one-to-one persistent relationship with a physical beacon (e.g., a cell base station ID assigned to a base station, a MAC address assigned to a Wi-Fi AP or BLE device, etc.) the physical beacon may be uniquely identified by the virtual beacon (e.g., the cell base station by its cell base station ID, the Wi-Fi AP by its MAC address, etc.). In such cases, the virtual beacon and the physical beacon may be treated to have the same characteristics, such as the same locations and probabilities.

For other classes of virtual beacons that have different relationships (e.g., one-to-one transient, one-to-many persistent, one-to-many transient, etc.) with physical beacon(s), the virtual beacon may be treated to have different characteristics, such as different locations and probabilities.

3. Multiple Locations for Beacons

Positioning system clients 115 on electronic devices 110 may observe both physical beacons and virtual beacons at multiple locations. Observations of physical beacons at multiple locations may be the result of various factors, including: a physical beacon is substantially static but is moved from one location to another; a physical beacon is mobile; some observations of a physical beacon report an incorrect location (e.g., due to error in estimating the location of the electronic device that produced the observation); a virtual beacon that has a relationship with a physical beacon is not actually unique within a domain of the physical beacon (e.g., so that multiple physical beacons are mistaken for a single physical beacon), among other possible factors. Observations of virtual beacons at multiple locations may be the result of various factors, including: a physical beacon that a virtual beacon has a relation relationship with (e.g., a one-to-one relationship with) moves, a virtual beacon has a relationship with multiple physical beacons (e.g., a one-to-many or many-to-many relationship with physical beacons), a virtual beacon has transient relationships with physical beacons (e.g., is assigned to different physical beacons over time), some observations of a virtual beacon report an incorrect location (e.g., due to error in estimating location of the electronic device that produces the observation), a virtual beacon has a relationship with a mobile physical beacon, among other possible factors.

Rather than select "best" characteristics (e.g., a single "best" location based on a criteria such as highest probability, most overlap with another location, most appropriate given other information, etc.) for a given beacon based on the observations, and discard all other characteristics (e.g., other locations), when aggregating observations the positioning system server software 140 may maintain multiple sets of characteristics (e.g., multiple locations) for the given beacon, each stored in the reference database 145 in association with a respective probability they are applicable to the beacon. In some implementations, a threshold is used. For example, a beacon may be associated with multiple locations in the reference database 145 each with a probability that the beacon is actually located at that location, provided the probability exceeds a predetermined threshold. Locations may be discarded if the association probability is below a predetermined threshold.

Figure 2:
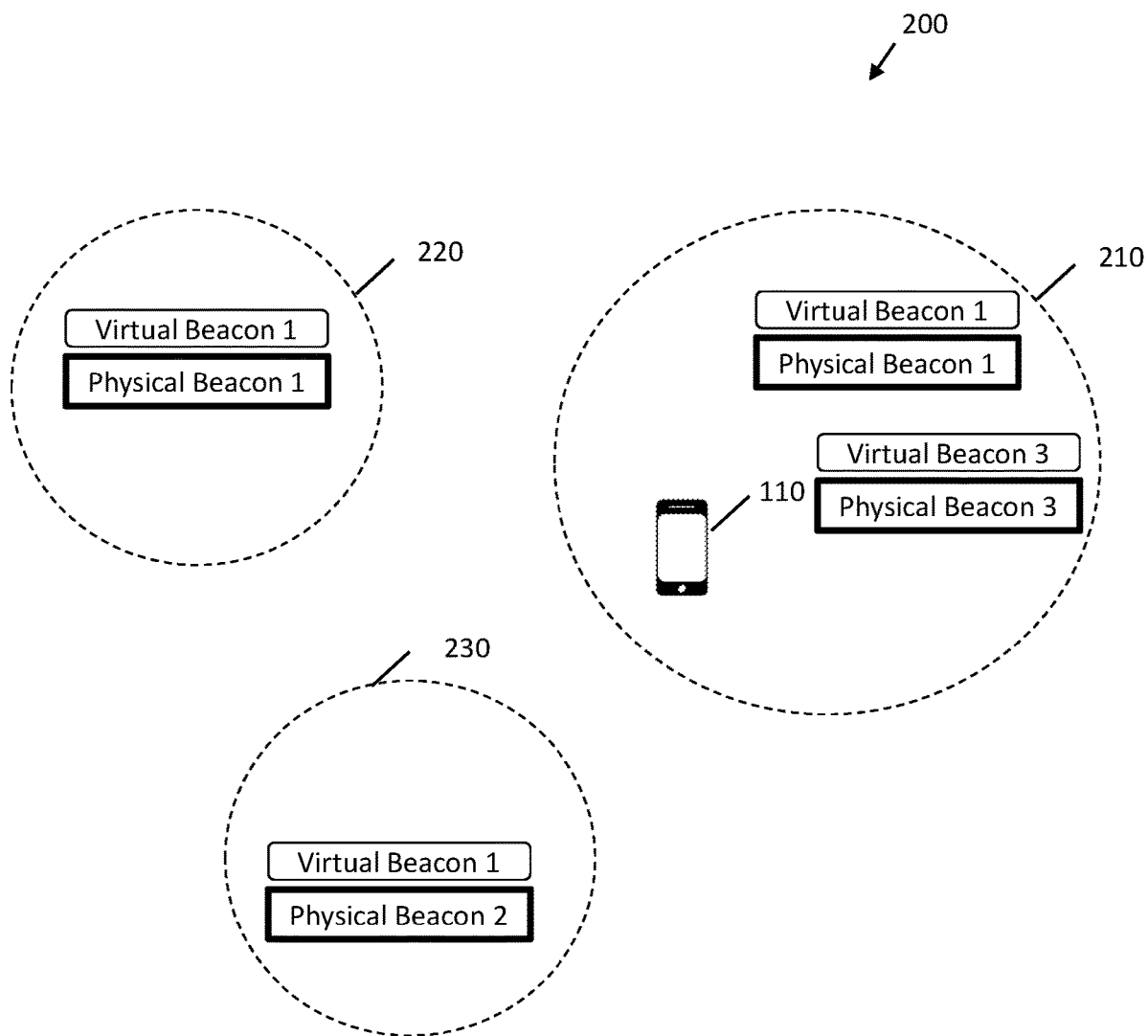
FIG. 2 is a diagram showing an example of beacons associated with multiple locations and an electronic device observing two of them.
Figure 3:
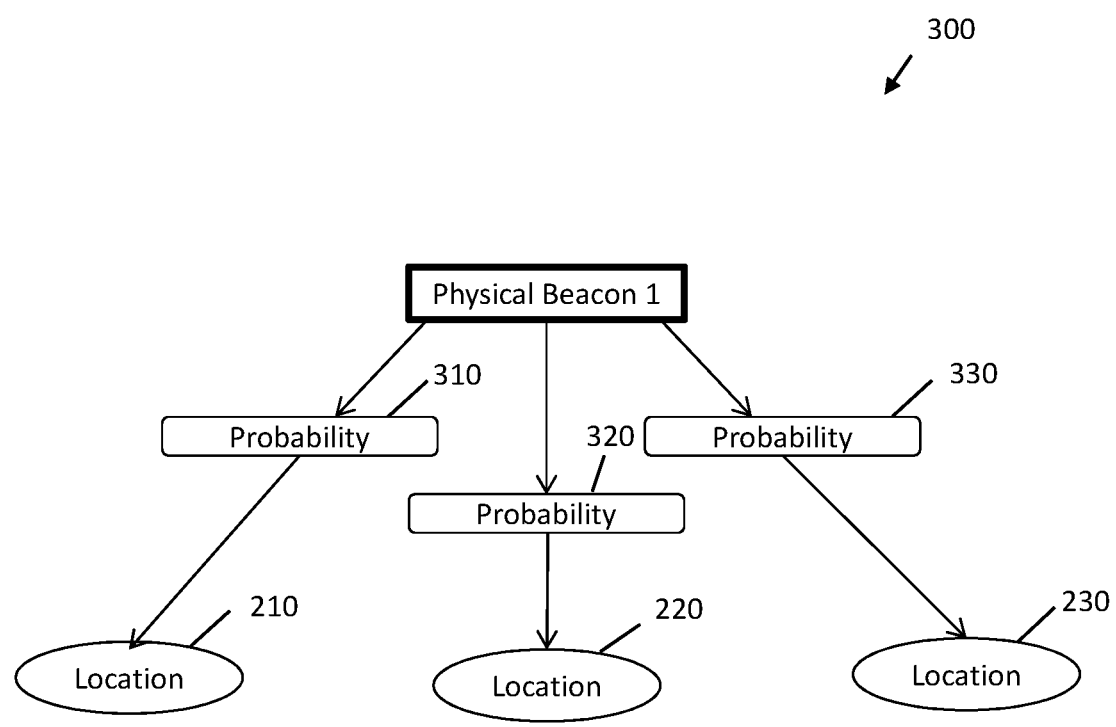
FIG. 3 is a diagram showing example associations of Virtual Beacon 1 from FIG. 2 with locations with probabilities.

FIG. 2 is a diagram 200 showing an example of beacons associated with multiple locations and an electronic device 110 observing two of them. Specifically, in this example, the positioning system clients 115 on the electronic device 110 currently observes Virtual Beacon 1 and Virtual Beacon 3 at location 210. Virtual Beacon 1 has a one-to-many relationship with both Physical Beacon 1 and Physical Beacon 2 (e.g., being periodically assigned to each physical beacon). As such, Virtual Beacon 1 has been observed at location 220 together with Physical Beacon 2. Physical Beacon 1 may also have moved recently. As such, Virtual Beacon 1 also has been observed at location 230. Rather than select a single "best" location for Virtual Beacon 1 (e.g., perhaps location 210) and only store that location in the reference database 145, locations 210, 220 and 230 are each associated with Virtual Beacon 1 in the reference database 145 with a respective probability that it accurately describes the beacon. FIG. 3 is a diagram 300 showing example associations of Virtual Beacon 1 from FIG. 2 with locations 210, 220, 230 with probabilities 310, 320, 330. The probabilities may be stored in the reference database 145.

Likewise, rather than select a single "best" location for Physical Beacon 1 (e.g., perhaps location 230), locations 210 and 230 may both be associated with Physical Beacon 1 in the reference database 145, each with a respective probability it accurately describes the beacon. Other beacons, such as Virtual Beacon 3, Physical Beacon 3, Physical Beacon 2, etc. may be associated only with a single location in the reference database 145.

4. Beacon Positioning and Probability Calculation

As mentioned above, beacons may be characterized by aggregating observations from positioning system clients 115 on electronic devices 110. Beacons may further be characterized by their relationships with other beacons (e.g., relationships between virtual beacons and physical beacons, relationships among multiple virtual beacons, relationships among multiple physical beacons, etc.).

The positioning system server software 140 processes the observations by filtering the observations (e.g., to remove likely "bad" or erroneous data) and grouping the remaining observations into clusters based on one or more clustering algorithms. The clustering algorithms may utilize spatial criteria, temporal criteria, spatio-temporal criteria, or other criteria to form the clusters. The positioning system server software 140 then calculates a probability each cluster accurately describes the beacon. In general, a principle of temporal impact may be considered in calculating probability, based on recency of observations, a temporal spread of observations, or other measures of absolute time or relative time. Temporal impact may be used to select a subset of observations from which probability is ultimately calculated based on other characteristics (e.g., only consider observations within a predetermined period of time). Alternatively, temporal impact may be used directly in the calculation of probability. For example, more recent observations may be considered to have more value and be weighted in a probability calculation more heavily than older observations. Likewise, observations that are less temporally spread may be considered to have more value and weighted in a probability calculation more heavily than observations captured a longer time apart.

Aside from temporal impact, probability may be calculated based on other criteria, such as a number of observations (e.g., more observations yielding a higher probability), a reliability or expected accuracy of observations (e.g., more reliable observations yielding a higher probability), a spatial or temporal spread of observations (e.g., less spread observations yielding a higher probability), a diversity of observations (e.g., observations from more diverse sources yielding a higher probability), a number of clusters, an expected number of moves of a beacon, or other characteristics.

The positioning system server software 140 selects clusters having a probability above a predetermined threshold to be retained. Clusters below the predetermined threshold may be discarded. Characteristics are then derived by the positioning system server software 140 from the selected clusters. The characteristics include a location for the cluster and potentially other characteristics, such as a spread of the observations that make up the cluster (e.g., a standard deviation of the observations a spatial or spatio-temporal domain), a number of observations that make up the cluster, a type of observations that make up the cluster, source of the observations that make up the cluster, a recency of observations that make up the cluster (e.g., a time since a last observation), an expected error of the observations that make up the cluster, a statistical measure of redundancy of the observations that make up the cluster, an among other characteristics.

The location of a cluster may be an average or a median of some or all locations of observations that make up the cluster (e.g., a 2D location as an average or a median of the latitude and longitude of the observations, a 3D location that include elevation, etc.). A principle of durability or persistence of location may be considered in calculating location. Further, more recent observations may be more heavily weighted than older observations (e.g., in a weighted average).

The characteristics of the cluster are used as beacon characteristics for a beacon associated with the cluster. The positioning system server software 140 updates the reference database 145 to store any new or updated locations or other characteristic of beacons in association with the respective beacon IDs of those beacons. Such updated beacon information may later be propagated to positioning system clients 115 on electronic devices 110 (e.g., in "tiles" or cache.)

In one specific example, consider a cluster associated with a virtual beacon that represents an IP address. Following the principle of spatial impact, only a subset of most recent observations may be utilized by the positioning system server software 140 based on a time difference between observations at different location. From that subset of observations, the probability that the cluster accurately describes the IP address (and thereby that the IP address is located at a location associated with the cluster) is calculated by the positioning system server software 140 using the number of observations, as a ratio of observations of the IP address in the cluster verses observations in any other clusters associated with the IP address.

Figure 4:
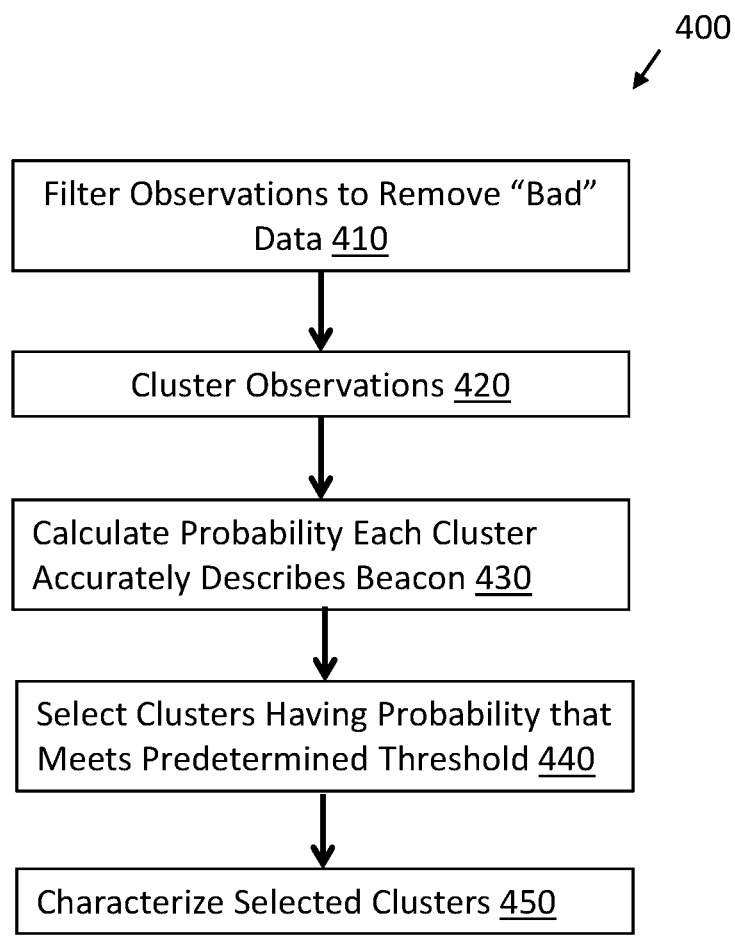
FIG. 4 is a flow diagram of an example algorithm that may be executed by positioning system server software to cluster observations and determine therefrom beacon locations and other characteristics.

FIG. 4 is a flow diagram of an example algorithm that may be executed by positioning system server software 140 using a clustering algorithm to cluster observations and determine therefrom beacon locations and other characteristics. In this example, it is assumed there are n observations of a beacon (represented as $t_1, t_2, \ldots t_n$), with each observation including a location (represented $l_1, l_2, \ldots l_n$), and each observation having a probability ($p_1, p_2, \ldots p_n$) that it accurately describes the beacon, for example the location of the observation accurately describes where the beacon is located.

At step 410, the positioning system server software 140 filters the n observations to remove likely "bad" erroneous data. For example, the probabilities ($p_1, p_2, \ldots p_n$) may be compared to a predetermined threshold (e.g., 0.5) and observations whose confidence is below the threshold removed.

At step 420, the positioning system server software 140 groups the remaining observations into k clusters using a clustering algorithm. For example, a spatial clustering algorithm may be used to group the observations based on their locations ($l_1, l_2, \ldots l_n$).

At step 430, the positioning system server software 140 calculates a probability each cluster accurately describes the beacon. For example, if a given cluster consists of m observations and the probability of each of them being correct is ($p_1, p_2, \ldots p_m$), the probability that the given cluster accurately describes the beacon is $p_{cluster\_1}=\max(p_1, p_2, \ldots p_m)$. The probability of the given cluster $p_{cluster}$ may be normalized among all k clusters, which have cluster probabilities ($p_{cluster\_1}, p_{cluster+2}, \ldots p_{cluster\_k}$) as $p_{cluster\_1}/(p_{cluster\_1}, p_{cluster+2}, \ldots p_{cluster\_k})$.

Then, at step 440, the positioning system server software 140 selects clusters having at least a probability above a predetermined threshold to be retained. For example, clusters having $p_{cluster}>0.7$ may be retained. The selection may yield multiple selected clusters for some beacons in some cases.

At step 450, the positioning system server software 140 derives characteristics from the selected clusters. The characteristics may include a location for the cluster (for example, a cluster center calculated as a median of observations) as well as other characteristics (for example, a spread of the observations, number of observations, etc.).

Subsequently, the probabilities and characteristics for each cluster are used for the beacon associated with the cluster, and the positioning system server software 140 updates the reference database 145 with the new beacon characteristics, including new locations and probabilities that the locations reflect the current location of the beacon. Since at least some beacons may be associated with multiple clusters having different locations, beacons may be associated with multiple locations in the reference database 145 with different probabilities.

In addition to characterizing beacons by aggregating observations, in various embodiments, at least some beacons may be characterized by their relationships with other beacons or beacon information. As discussed above, a virtual beacon may have a relationship with a physical beacon, such that a location of the physical beacon may be used as a location of the virtual beacon. Likewise, a virtual beacon may have a relationship with another virtual beacon or a physical beacon may have a relationship with another physical beacon such that a determined location of one such beacon may inform the location of the other beacon. For example, in the case of a beacon being a sector of a cell base station, once the location of one sector of the base station is determined, it can inform the location of the other sectors of the base station. Further, beacon information may directly inform the location of a beacon. For example, beacon information may indicate a type of beacon which has physical limitations (e.g., the type is a cell base station that is physically difficult to move), which may inform the likelihood the beacon has moved to a new location or the ID has been reassigned.

5. Use of Multiple Locations in Electronic Device Location Determination

The location of an electronic device 110 may be determined based on beacons observed by the wireless interface of the device. When an observed beacon is associated with multiple locations, each of these multiple locations may be considered in location estimation.

Figure 5:
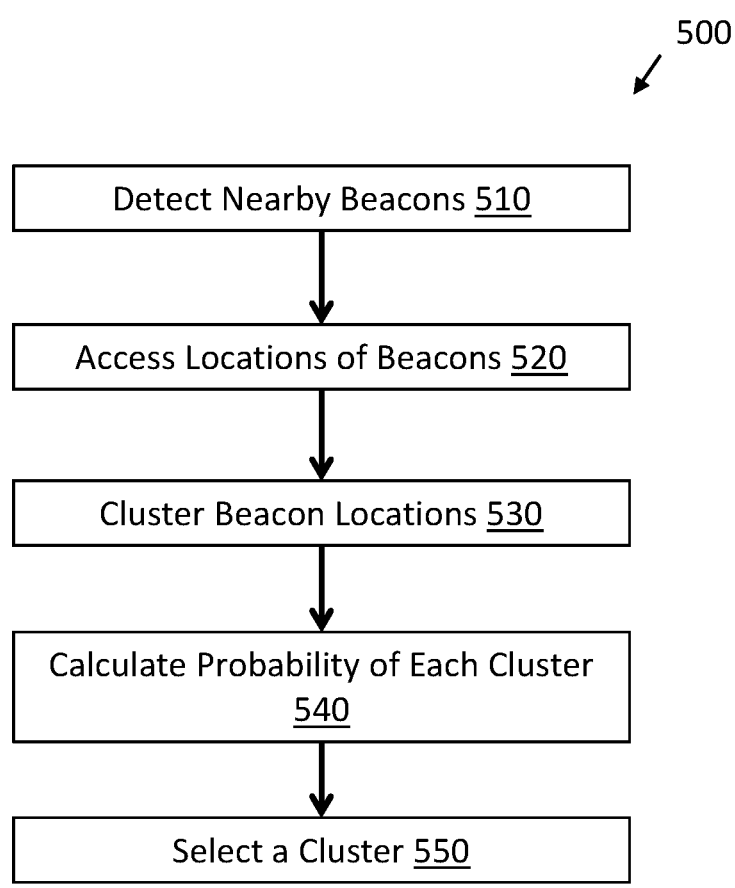
FIG. 5 is a flow diagram of an example sequence of steps that may be executed by positioning system clients to determine the location of an electronic device.

FIG. 5 is a flow diagram of an example sequence of steps 500 that may be executed by the positioning system clients 115 using a positioning algorithm to determine the location of an electronic device 110. At step 510, the positioning system client 115 uses the wireless interface of the electronic device 110 to detect beacon information for nearby beacons (e.g., beacons within signal reception range) and create a list of detected beacons. In some implementations, the list is filtered to remove certain beacons, based on characteristics of the beacons, such as a type of the beacon (e.g., ad-hoc Wi-Fi APs may be filtered out), expected error of the beacon, etc. The filtering may be performed based on information in the detected beacon information itself or accessed via lookup, for example in the local copy of the reference database 130.

At step 520, for each remaining beacon of the list of detected beacons, the positioning system client 115 accesses one or more locations and probabilities that the beacon is at the location, for example from the local copy of the reference database 130, and provides the identity of the beacon and the one or more locations to a positioning algorithm for use in determining one or more potential locations at which the electronic device 110 may be located.

To this end, at step 530, the positioning algorithm clusters all of the locations of the remaining beacons spatially. Then at step 540, the positioning algorithm calculates a probability that each cluster represents the location of the electronic device. The probability calculation may be based on characteristics of the cluster itself (e.g., a number of locations of beacons that make up the cluster) and characteristics of beacons whose locations make up the cluster (e.g., probabilities that the beacons are at the locations and other characteristics). For example, the probability of a cluster may be calculated as a sum of the probabilities the locations that make up the cluster are the actual locations of beacons, such that it is dependent upon both the number of locations and their probabilities of being correct.

At step 550, the positioning algorithm selects a cluster having the greatest probability and a location is estimated therefrom (e.g., by averaging or finding the median of all the locations that make up the selected cluster). The selected cluster's location is used as the estimated location of the electronic device 110.

In some implementations, the positioning algorithm also computes and returns an expected error of the estimated location of the electronic device 110. The expected error may be a coarse location that measures significant deviations in an estimated location of the electronic device from the actual location of the electronic device. In such case, the error may result from selection of an incorrect cluster of the clusters determined in step 630 (i.e. a cluster that does not reflect the actual location of the electronic device 110). Coarse location error may be calculated by the positioning algorithm based on probabilities of clusters determined in step 550, distances between the clusters, distances between the selected cluster and another cluster, and/or other factors. A coarse expected error may be reported for a confidence interval (e.g., a 95% or 67% confidence interval).

Alternatively, the expected error may be a fine location error that is a measure of imprecision in an estimated location of an electronic device that is within the general vicinity of the actual location of the electronic device. In such case, the error may result from imprecision in estimating location from a correct cluster. Fine location error may be calculated by the positioning algorithm based on size of the selected cluster, number of locations in the selected cluster, signal strength of beacons whose locations are in the selected cluster, and/or other factors.

Subsequently, the positioning system clients 115 may provide the estimated location of the electronic device 110, and potentially the expected error, to a LBS app 120 operating on the electronic device, to enable location-based services. The estimated location may also be used as the location in new observations being produced by the positioning system clients 115 on the electronic device 110, providing a closed feedback loop where better location determination of the electronic device leads to better observations being captured using the electronics deice, which helps improve beacon locations, probabilities and other characteristics in the reference database 145, which in turn leads to better location determination for the electronic device.

Figure 6:
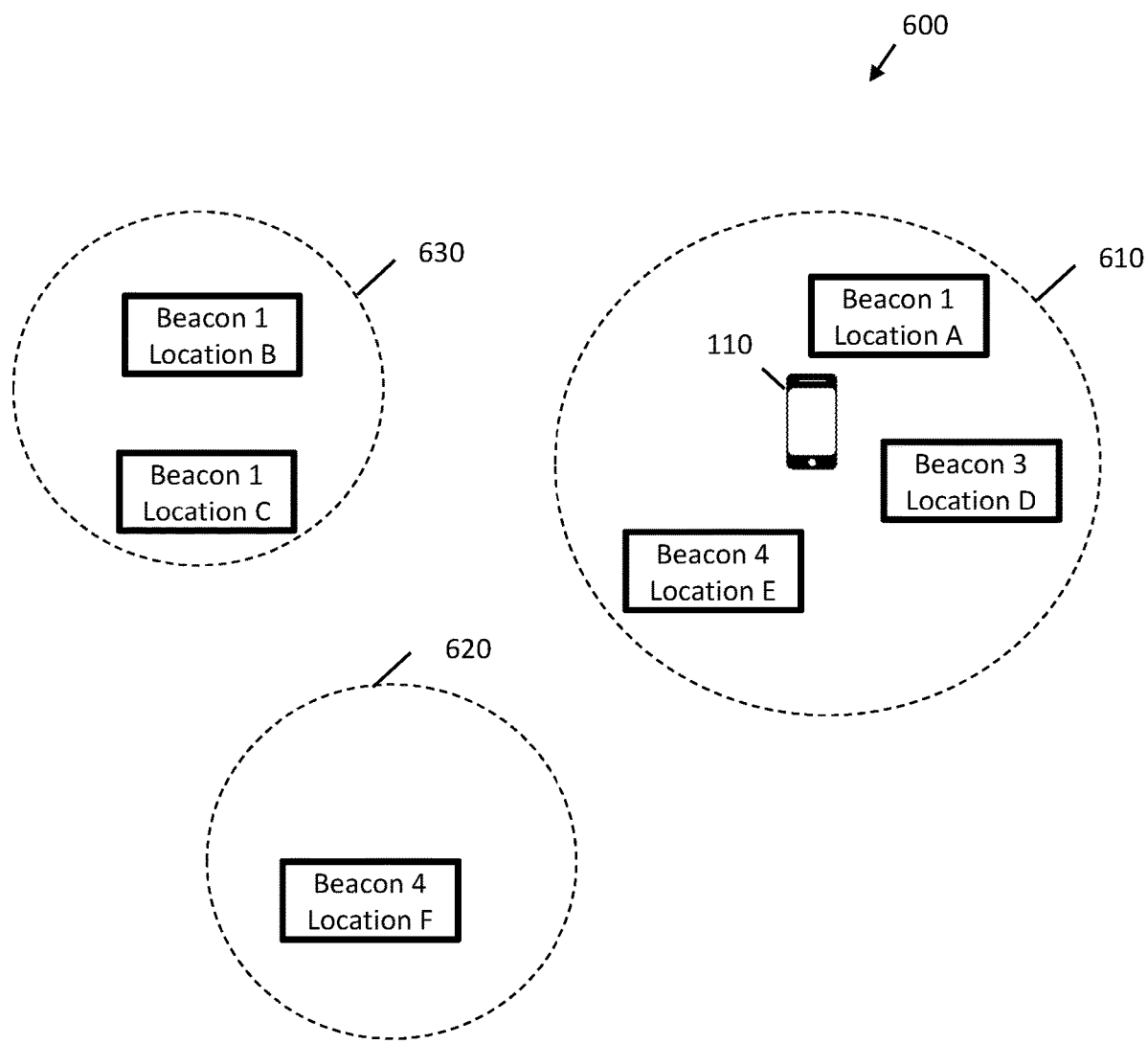
FIG. 6 is a diagram illustrating an example of determining the location of an electronic device by a positioning system client using beacons that have multiple locations.

FIG. 6 is a diagram 600 illustrating an example of determining the location of an electronic device 110 by a positioning system client 115 using beacons that have multiple locations. The positioning system client 115 uses the wireless interface of the electronic device 110 to detect Beacon 1, Beacon 2, Beacon 3 and Beacon 4. The beacons on this list are looked up, for example in the local copy of the reference database 130, to determine that Beacon 1 has two locations: Location A and Location B; Beacon 2 has a single location: Location C; Beacon 3 has a single location: Location D; and Beacon 4 has two locations: Location E and Location F. All the locations are spatially clustered to form clusters 610, 620, 630, of which cluster 630 is selected as having a highest probability of representing the actual location of the electronic device 110. A location determined from cluster 630 is thereafter returned as the estimated location of the electronic device 110.

CONCLUSION

In summary, the above description details techniques for determining and associating multiple locations with beacons and estimating the location of an electronic device based on beacons having multiple associated locations. It should be understood that the techniques and portions thereof may be utilized together, individually, or in combination with other techniques, depending on the implementation. Further, it should be understood that aspects of the techniques may be modified, added to, removed, or otherwise changed depending on the implementation. For example, while specific example hardware and software is discussed above, it should be understood that the techniques may be implemented using a variety of different types of hardware, software, and combination thereof. Such hardware may include a variety of types of processors, memory chips, programmable logic circuits, application specific integrated circuits, and/or other types of hardware components that support execution of software. Such software may include executable instructions that implement applications stored in a non-transitory machine-readable medium, such as a volatile or persistent memory device, a hard-disk, or other data store. Combinations of software and hardware may be adapted to suit different environments and applications. Above all, it should be understood that the above descriptions are meant to be taken only by way of example.

What is claimed is:

1. A method for determining and associating multiple locations with beacons used to estimate the location of an electronic device:

receiving, by a positioning system, observations of beacons whose wireless signals are detected by electronic devices, each observation including beacon information and a location of the respective electronic device;

grouping the observations into observation clusters;

calculating a probability each observation cluster accurately describes a beacon;

selecting multiple observation clusters as representative of the beacon based on the calculated probabilities;

deriving, by the positioning system, characteristics for the beacon based on the selected multiple observation clusters, the characteristics including multiple locations for the beacon;

storing at least the multiple locations for the beacon in a reference database maintained by the positioning system; and using the multiple locations for the beacon from the reference database in estimating the location of an electronic device.

2. The method of claim 1, further comprising: filtering the observations to remove observations whose confidence is below a threshold.

3. The method of claim 1, wherein the grouping is performed by a clustering algorithm that utilizes at least one of spatial criteria, temporal criteria, or spatio-temporal criteria to form the observation clusters.

4. The method of claim 1, wherein the selecting further comprises:
comparing the probability of each observation cluster to a predetermined threshold; and
retaining observation clusters whose probability meets the predetermined threshold, and discarding any observation clusters whose probability is below the predetermined threshold.

5. The method of claim 1, wherein the storing further comprises storing a probability in association with each of the multiple locations of the beacon in the reference database, and the method further comprises:
using the associated probability for each of the multiple locations for the beacon in estimating the location of the electronic device.

6. The method of claim 1, wherein the using further comprises:
providing the multiple locations to update a local copy of the reference database maintained on the electronic device.

7. The method of claim 6, wherein the using further comprises
using a wireless interface of an electronic device to detect beacon information for beacons within signal reception range;
accessing one or more locations for the beacons from the local copy of the reference database, at least one of the beacons having the multiple locations;
grouping the accessed locations into observation clusters;
calculating a probability each observation cluster represents a location of the electronic device;
selecting an observation cluster to represent the location of the electronic device based on the calculated probabilities; and
estimating a location of the electronic device based on the selected observation cluster.

8. The method of claim 1, wherein the beacon is a physical beacon.

9. The method of claim 1, wherein the beacon is a virtual beacon.

10. The method of claim 1, wherein the positioning system includes positioning system server software executing on a server, and at least the receiving, grouping, calculating, selecting and deriving are performed by the positioning system server software.

11. A method for estimating a location of an electronic device based on beacons having multiple associated locations, comprising:

using a wireless interface of the electronic device to detect beacon information for beacons within signal reception range, to create a list of detected beacons;
accessing, by a positioning system, one or more locations for each of the beacons on the list of detected beacons, at least one of the beacons having multiple locations;
grouping the accessed locations into location clusters;
calculating a probability each location cluster represents a location of the electronic device;
selecting, by the positioning system, a location cluster to represent the location of the electronic device based on the calculated probabilities; and
estimating, by the positioning system, a location of the electronic device based on the selected location cluster.

12. The method of claim 11, further comprising:
filtering the list of detected beacons based on characteristics of the beacons to remove one or more beacons, wherein the accessing is performed for the remaining beacons of the list of detected beacons.

13. The method of claim 11, wherein the accessing further comprises:
accessing probabilities that the beacons are at each of the locations, and
wherein the calculating is based at least in part on the probabilities that the beacons are at each of the locations.

14. The method of claim 11, further comprising:
computing an expected error of the location estimate, the expected error being at least one of a coarse location error or a fine location error.

15. The method of claim 11, further comprising:
providing the location of the electronic device to a location-based services application to enable a location based service to a user of the electronic device.

16. The method of claim 11, further comprising:
using the location of the electronic device in one or more observations of beacons taken by the electronic device and used to update the reference database, thereby forming a closed feedback loop.

17. The method of claim 11, wherein at least one of the beacons is a physical beacon.

18. The method of claim 11, wherein at least one of the beacons is a virtual beacon.

19. The method of claim 11, wherein the positioning system includes client positioning system server software executing on the electronic device, and at least the using, accessing, grouping, calculating, selecting, and estimating are performed by the positioning system client.

20. A system for determining and associating multiple locations with beacons used to estimate the location of an electronic device:
a plurality of electronic devices each having a wireless interface and configured to execute a positioning system client, the positioning system client, when executed, to:
use the wireless interface to capture observations of beacons whose wireless signals are in signal reception range; and
a server configured to execute positioning system server software, the positioning system server software, when executed, to:
receive the observations of beacons from the plurality of electronic devices;
group the observations into observation clusters;
calculate a probability each observation cluster accurately describes a beacon;

select multiple observation clusters as representative of the beacon based on the calculated probabilities;

derive characteristics for the beacon based on the selected multiple observation clusters, the characteristics including multiple locations for the beacon;

store at least the multiple locations for the beacon in a reference database; and provide the multiple locations for the beacon from the reference database to the positioning system client of at least one of the plurality of electronic devices for use in estimating the location of the at least one electronic device.

* * * * *